United States Patent [19]

Watanabe

[11] Patent Number: 5,043,551

[45] Date of Patent: Aug. 27, 1991

[54] WIRE CUT-TYPE ELECTRIC DISCHARGING METHOD

[75] Inventor: Naoki Watanabe, Aichi, Japan

[73] Assignee: Mitsubishi Denki K.K., Tokyo, Japan

[21] Appl. No.: 495,064

[22] Filed: Mar. 16, 1990

[30] Foreign Application Priority Data

Mar. 23, 1989 [JP] Japan .................. 1-71000

[51] Int. Cl.$^5$ ............................................. B23H 7/06
[52] U.S. Cl. ................................ 219/69.12; 219/69.17
[58] Field of Search ....................... 219/69.12, 69.17; 364/474.04, 474.28

[56] References Cited

U.S. PATENT DOCUMENTS

| | | | |
|---|---|---|---|
| 4,467,166 | 8/1984 | Gamo et al. | 219/69.12 |
| 4,644,124 | 2/1987 | Hori et al. | 219/69.17 |
| 4,700,314 | 10/1987 | Kinoshita | 219/69.17 |
| 4,843,203 | 6/1989 | Gamo et al. | 219/69.12 |

FOREIGN PATENT DOCUMENTS

120930 10/1980 Japan .

*Primary Examiner*—Geoffrey S. Evans
*Attorney, Agent, or Firm*—Sughrue, Mion, Zinn Macpeak & Seas

[57] ABSTRACT

A wire cut-type electric discharging method of machining a work for machining a portion having a predetermined taper wherein the portion to be machined comprises a first straight section, a second straight section extending in parallel to the first straight section and an arc-shaped section located between the first and second straight sections. A vector is derived representing a positional relationship among a number of corresponding positions on two machining tracks each comprising a first straight track, an arc-shaped track and a second straight track. The first straight tracks, the arc-shaped tracks and the second straight tracks are formed by allowing the portion to be machined to intersect the upper and lower surfaces of the work. A start point and an end point of the arc-shaped track constituting one of the machining tracks are determined by displacing a start point and an end point of the arc-shaped track constituting the other machining track by a magnitude of the vector. Thus, the other machining track is determined subsequent to the determination of the one machining track. The portion to be machined is machined by displacing a wire serving as an electrode along both the machining tracks.

4 Claims, 7 Drawing Sheets

WIRE CUT-TYPE ELECTRIC DISCHARGING METHOD

BACKGROUND OF THE INVENTION

1. Field of the Invention

The present invention relates to a wire cut-type electric discharging method employable for creating a tapered surface on a work by employing a wire serving as an electrode held in an inclined state relative to a reference surface of the work.

2. Description of the Prior Art

To facilitate understanding of the present invention, a conventional wire cut-type electric discharge apparatus will be described below with reference to FIGS. 10 to 14.

Figure 10:
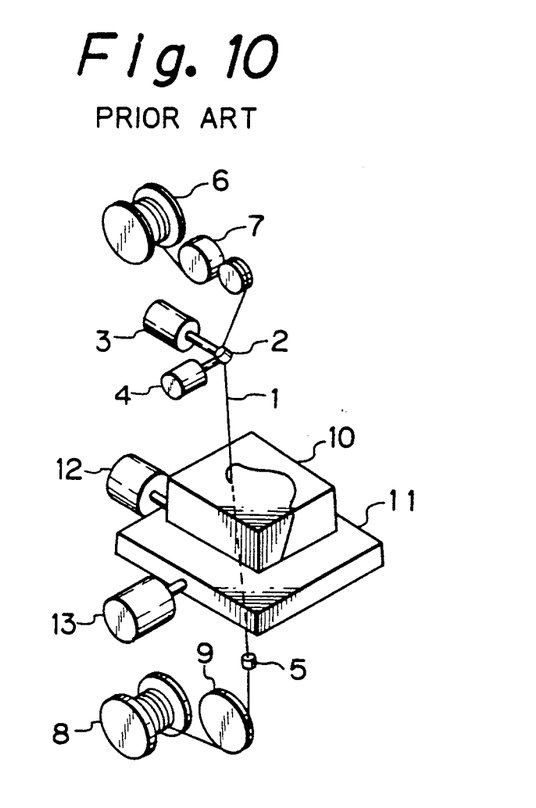
FIG. 10 is a schematic perspective view illustrating a conventional wire cut-type electric discharge apparatus in a disassembled state.

FIG. 10 is a schematic perspective view of the apparatus in a disassembled state. In the drawing, reference numeral 1 designates a wire serving as an electrode for a cutting operation, reference numeral 2 designates an upper wire guide for guiding the movement of the wire 1, reference numeral 3 designates a driving unit for moving the upper wire guide 2 in a U-direction, reference numeral 4 designates another driving unit for moving the upper wire guide in a V-direction, reference numeral 5 designates a lower wire guide for guiding the movement of the wire 1, reference numeral 6 designates a wire unwinding reel, reference numeral 7 designates a wire feeding roller, reference numeral 8 a wire winding reel, reference numeral 9 designates a wire winding guide roller, reference numeral 10 designates a work held in a space between the upper wire guide 2 and the lower wire guide 5, reference numeral 11 designates a movable table on which the work 10 is firmly mounted, reference numeral 12 designates a driving unit for driving the movable table 11 in an X-coordinate direction and reference numeral 13 designates another driving unit for driving the movable table 11 in a Y-coordinate direction.

Figure 11A:
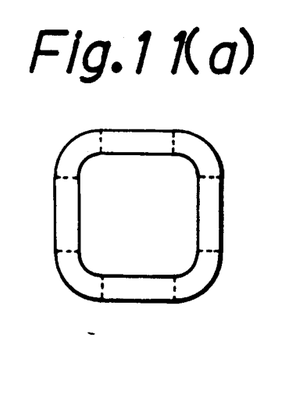
FIGS. 11(a), (b) and (c) are views as seen in three directions which illustrate the work after completion of a taper machining operation for a truncated conical configuration by a conventional electric discharging method.
Figure 11B:
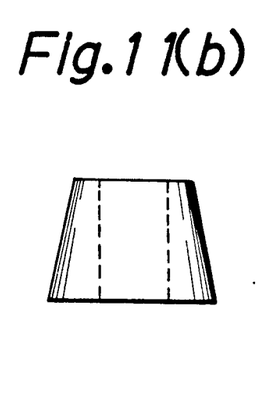
Figure 11C:
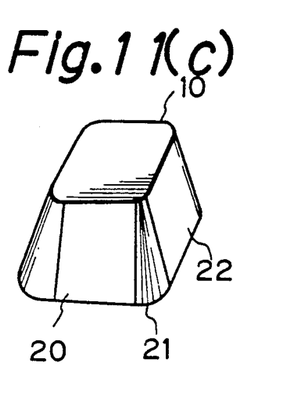
Figure 12A:
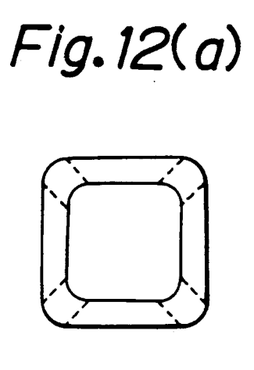
FIGS. 12(a), (b) and (c) are views as seen in three directions which illustrates another work after completion of a taper machining operation for a truncated conical configuration having the same corner radius on the upper and lower surfaces by the conventional electric discharging method.
Figure 12B:
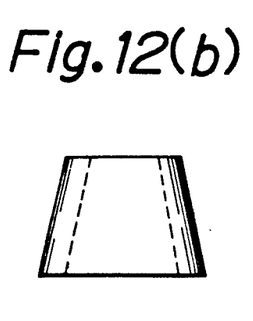
Figure 12C:
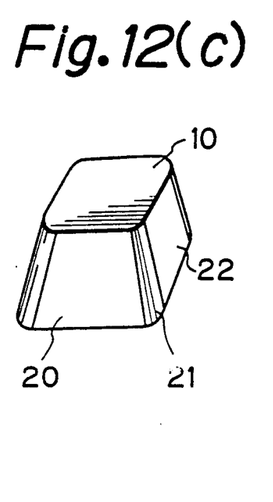

FIGS. 11 and 12 illustrate by way of example a work on which taper machining has been carried out by operation of the above-described electric discharge apparatus. FIG. 11 illustrates a case where taper machining has been carried out on a truncated conical work 10 and FIG. 12 illustrates a case where taper machining has been carried out on a work 10 which has the same corner radius on both the upper and lower surfaces thereof. Incidentally, FIG. 11(a) and FIG. 12(a) are plan views of the work 10, FIG. 11(b) and FIG. 12(b) are front views of the work 10 and FIG. 11(c) and FIG. 12(c) are perspective views of the work 10, respectively.

Figure 13:
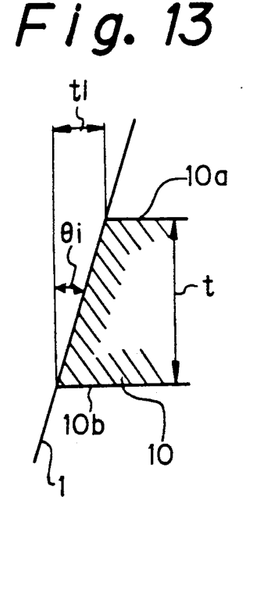
FIG. 13 is a fragmentary sectional view of the work during a taper machining operation.

FIG. 13 is a fragmentary sectional view of the work 10 as seen during taper machining. In the drawing, reference character t designates a thickness of the work 10, reference character $\theta_i$ designates an inclination angle of the wire 1 relative to a vertical plane (i.e., a wire inclination angle) and reference character $t_i$ designates a distance of the machining region between the upper surface 10a and the lower surface 10b of the work 10 as seen in the horizontal direction. The distance $t_i$ represents a quantity which is determined by the wire inclination angle $\theta_i$ and the thickness t of the work 10, i.e., the amount of taper-offset.

Figure 14:
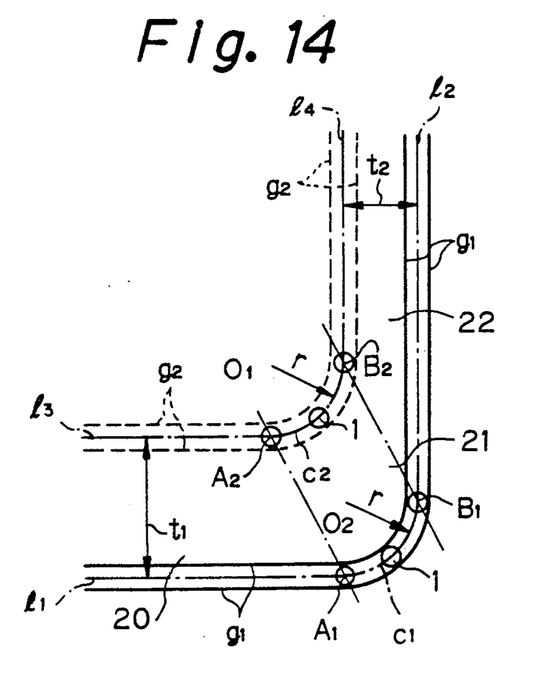
FIG. 14 is an explanatory view illustrating machining tracks of a taper machining operation for a truncated conical configuration having the same corner radius on the upper and lower surfaces by the conventional electric discharging method.

FIG. 14 is an explanatory plan view illustrating a machining track which is created by a conventional method of performing a taper machining operation on the work 10 having the same corner radius on both its upper and lower surfaces. In the drawing, reference numeral 20 designates a first straight section, reference numeral 21 designates an arc-shaped section extending tangential to the first straight section 20 and reference numeral 22 designates a second straight section extending in a likewise tangential manner to the corner section 21. Reference characters $l_1$, $c_1$ and $l_2$ designate a first straight track, an arc-shaped track and a second straight track on the lower surface 10b of the work 10 and reference characters $l_3$, $c_2$ and $l_4$ designate a first straight track, an arc-shaped track and a second straight track on the upper surface 10a of the work 10. Reference characters $O_1$ and $O_2$ designate center points of the arc-shaped tracks $c_1$ and $c_2$. Reference character r designates a radius of each of the arc-shaped tracks $c_1$ and $c_2$ on the upper and lower surfaces of the work 10. The radius r of the lower arc-shaped track $c_1$ is equal to that of the upper arc-shaped track $c_2$. Reference character $t_1$ designates an amount of taper-offset at the first straight section 20 and reference character $t_2$ designates an amount of taper-offset at the second straight section 22. Both the quantities $t_1$ and $t_2$ are represented by the following equations.

$$t_1 = t \times \tan \theta_1$$

$$t_2 = t \times \tan \theta_2$$

where t is a thickness of the work and $\theta_1$ and $\theta_2$ are wire inclination angels at the first and second straight sections.

Further, reference character $g_1$ designates a machined groove which appears on the lower surface 10b of the work 10 after the wire 1 has been applied, and reference character $g_2$ designates another machined groove which appears on the upper surface 10a of the work 10 after the wire 1 has been applied.

Next, the operation of the apparatus will be described below.

As is well known, a wire cut-type electric discharge machining operation is performed such that a work 10 is displaced relative to a wire 1 by actuating driving units 12 and 13 to operate the movable table 11 and a product having a desired contour is cut out from the work 10. In addition to the foregoing electric discharge machining operation, there is a known method of performing a taper machining operation on a work 10 to create a slantwise extending surface by operating the electric discharge apparatus with synchronous cooperation of the driving units 12 and 13 with the driving units 3 and 4 to move the wire guide 2. A hitherto known taper machining method is typically shown in FIGS. 11 and 12. FIG. 11 shows taper machining on a truncated conical product and FIG. 12 shows taper machining similar to that in FIG. 11 with the exception that four arc-shaped sections are taper machined with the same radius. Particularly, the taper machining shown in FIG. 12 should be carried out on the arc-shaped section at the same machining speed on both the upper and lower surfaces of the work 10 by the same amount within the same period of time on both the upper and lower surfaces of the work. This causes the width of the machined groove along the edge line of the upper surface of the work to be equal to that of the lower surface of the same. Therefore, the method shown in FIG. 12 is essential for performing a machining operation to an accurate taper angle.

The method shown in FIG. 12 will be described in more detail below with reference to FIG. 14.

As disclosed in Japanese Patent Publication No. 49053/1986, to create an arc-shaped contour on an upper surface $10a$ of a work 10 corresponding to an arc-shaped section 21 having first and second straight sections 20 and 22 extended therefrom on a lower surface $10b$ of the work 10, first and second straight tracks $l_3$ and $l_4$ on the upper surface $10a$ of the work 10 spaced away from first and second straight tracks $l_1$ and $l_2$ on the lower surface $10b$ of the work 10 by taper-offset quantities $t_1$ and $t_2$ are first derived and an arc-shaped track $c_2$ extending tangential to the first and second straight tracks $l_3$ and $l_4$ on the upper surface $10a$ of the work 10 is then derived. So as to allow arc start points $A_1$ and $A_2$ of the arc-shaped tracks $c_1$ and $c_2$ to correspond to arc end points $B_1$ and $B_2$ of the same on the upper and lower surfaces $10a$ and $10b$ of the work 10, the wire inclination angle is gradually varied during a machining operation along the first straight section 20 until the wire 1 simultaneously reaches the arc start points $A_1$ and $A_2$ of the arc-shaped tracks $c_1$ and $c_2$. Once the wire 1 has reached the arc start points $A_1$ and $A_2$, the arc-shaped section 21 is taper machined along the arc-shaped tracks $c_1$ and $c_2$ (each having the same radius) until the wire 1 simultaneously reaches the arc end points $B_1$ and $B_2$ of the arc-shaped tracks $c_1$ and $c_2$, while the wire inclination angle is held constant. Thereafter, the second straight section 22 is taper machined from the arc end points $B_1$ and $B_2$ while the inclination angle of the wire is gradually varied. Such taper machining causes the tracks derived from arc machining on the upper and lower surfaces $10a$ and $10b$ of the work 10 to have the same radius. Thus, a taper machining operation is performed at a constant speed on the upper and lower surfaces $10a$ and $10b$ of the work 10 without any variation in groove width. Consequently, taper machining with the same radius on the upper and lower surfaces of the work can be accomplished with a high degree of accuracy.

However, the method of taper machining to the same radius on the upper and lower surfaces of the work as disclosed in the prior invention is applicable only to a case where an arc-shaped section located between two straight sections is contoured tangential to both the straight sections (i.e., a case where two straight sections extend tangential to an arc). Thus, a machining operation can be performed only after positions where the straight sections reach the arc-shaped section as well as a radius of the arc-shaped section are determined.

In practice, however, a taper machining operation must be performed not only in a case as described above but also in a case of a convex circular contour or a concave circular contour, i.e., an arc-shaped contour having no tangential joint part, or in a contour having tangential joint parts but including two parallel straight sections with an arc-shaped section located therebetween for which machining should be accomplished in opposite directions. In such a case, with the conventional machining technique disclosed in the prior invention, joint parts between the straight sections and the arc-shaped section or a center point of the arc-shaped section cannot be definitely determined. For this reason, other complicated taper machining method must be employed for taper machining an arc-shaped section having the same radius on the upper and lower surfaces of a work but including no tangential joint part.

SUMMARY OF THE INVENTION

The present invention has been made with the foregoing background in mind and its object resides in providing a wire cut-type electric discharging method which assures that taper machining can be accomplished with the same radius on the upper and lower surfaces of a work not only for a normal arc-shaped contour but also for a contour having tangential joint parts which include two parallel straight sections and a tapered arc-shaped section located therebetween.

To accomplish the above object, the present invention provides a wire cut-type electric discharging method of machining a work for machining a portion having a predetermined taper, such a portion comprising a first straight section, a second straight section extending in parallel with the first straight section and an arc-shaped section located between the first and second straight sections and having the same radius on the upper and lower surfaces, wherein the method comprises the steps of deriving a vector representative of a positional relationship among a number of corresponding points on two machining tracks each of which is defined by a first straight track, an arc-shaped track and a second straight track by allowing the portion to be machined to intersect the upper and lower surfaces of the work, determining a start point and an end point of the arc-shaped track on one of the machining tracks by displacing a start point and an end point of the arc-shaped track on the other machining track by a quantity of the vector, determining the other machining track based on one of the machining tracks which has been determined in the above-described manner, and machining the said portion while moving a wire serving as an electrode along both the machining tracks.

In a case where the arc-shaped section located between the first and second parallel straight sections is machined while the wire is held in an inclined state relative to a reference surface of the work, the arc-shaped track on the upper surface or the lower surface of the work is displaced from each other in a parallel relationship by a vector which is perpendicular to the straight tracks located in front of and behind the arc-shaped track and of which the scalar quantity is determined by a wire inclination angle and thickness of the work.

Further, in a case where the arc-shaped section located between the first and second parallel straight sections is machined such that a direction in which the first straight section is machined is in parallel with a direction in which the second straight section is machined but the former is opposite to the latter, the arc-shaped track on the upper surface or the lower surface of the work is displaced from each other in a parallel relationship by a vector which is in parallel with the straight tracks located in front of and behind the arc-shaped track and of which scalar quantity is equal to the amount of taper-offset. The respective tracks on the upper and lower surfaces of the work are determined while a start point and an end point of the arc-shaped track on the upper surface of the work correspond to those on the lower surface of the work. The first straight section, the arc-shaped section and the second straight section are successively machined along the thus determined machining tracks.

According to the present invention, an arc opening angle and an arc start angle of the arc-shaped track can be equalized on the upper and lower surfaces of a work by displacing the arc-shaped track on the upper or lower surface of the work in a parallel relationship by a vector which is perpendicular to the straight tracks located in front of and behind the arc-shaped tracks and a scalar quantity of the vector is equal to an amount of taper-offset. Alternatively, an arc opening angle and an arc start angle of the arc-shaped track on the upper and lower surfaces of the work may be equalized on the upper and lower surfaces by displacing the arc-shaped section on the upper or lower surface in a parallel relationship by a vector which is in parallel with the straight tracks and the scalar quantity of the vector is equal to an amount of taper-offset.

According to the present invention, a machining track including an arc-shaped track located between two parallel straight tracks as well as a machining track including two parallel straight tracks adapted to be machined in opposite directions and an arc-shaped track located between the two parallel straight tracks and adapted to be taper machined can be machined. Movement of the wire serving as an electrode is guided so as to allow the wire to simultaneously pass by a number of corresponding points on the machining tracks on the upper and lower surfaces of the work.

Other objects, features and advantages of the present invention will be readily apparent from reading the following description with reference to the accompanying drawings.

BRIEF DESCRIPTION OF THE DRAWINGS

The present invention is illustrated in the following drawings in which.

DESCRIPTION OF THE PREFERRED EMBODIMENT

Now, the present invention will be described in detail hereinafter with reference to the accompanying drawings which illustrate a preferred embodiment thereof.

Figure 1:
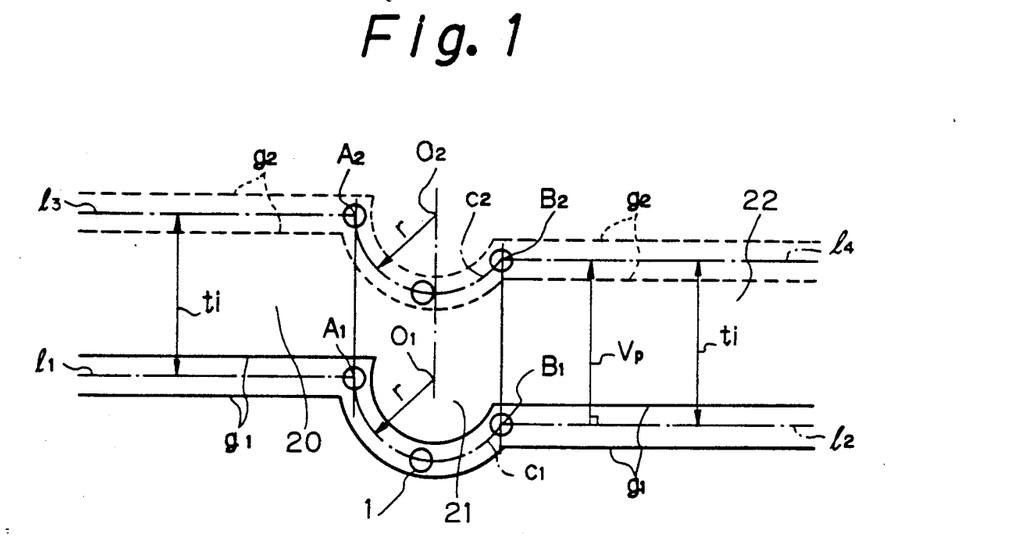
FIG. 1 is an explanatory view which illustrates machining tracks for a product having a convex arc-shaped section created by a wire cut-type electric discharging method in accordance with an embodiment of the present invention.

FIG. 1 is an explanatory view which illustrates machining tracks which are created by a wire cut-type electric discharging method in accordance with an embodiment of the present invention. As is apparent from the drawing, each machining track includes two straight sections and an arc-shaped section located therebetween.

In the drawing, reference numeral 20 denotes a first straight section, reference numeral 21 denotes an arc-shaped section and reference numeral 22 denotes a second straight section. Reference characters $l_1$ to $l_4$, $c_1$, $c_2$, $g_1$, $g_2$, $O_1$, $O_2$ and $r$ denote the same components as those shown in FIG. 14. Reference character $t_i$ denotes an amount of taper-offset. The first straight section 20 and the second straight section 22 have the same amount of taper-offset, respectively.

Reference character $A_1$ denotes an end point of the first straight track $l_1$ on the lower surface $10b$ of a work 10 (or a start point of the arc-shaped track $c_1$) and reference character $B_1$ denotes an end point of the arc-shaped track $c_1$ (or a start point of the second straight track $l_2$). In addition, reference character $A_2$ denotes an end point of the first straight track $l_3$ on the upper surface $10a$ of the work 10 (or a start point of the arc-shaped track $c_2$) and reference character $B_2$ denotes an end point of the arc-shaped tracks $c_2$ (a start point of the second straight track $l_4$).

Figure 2:
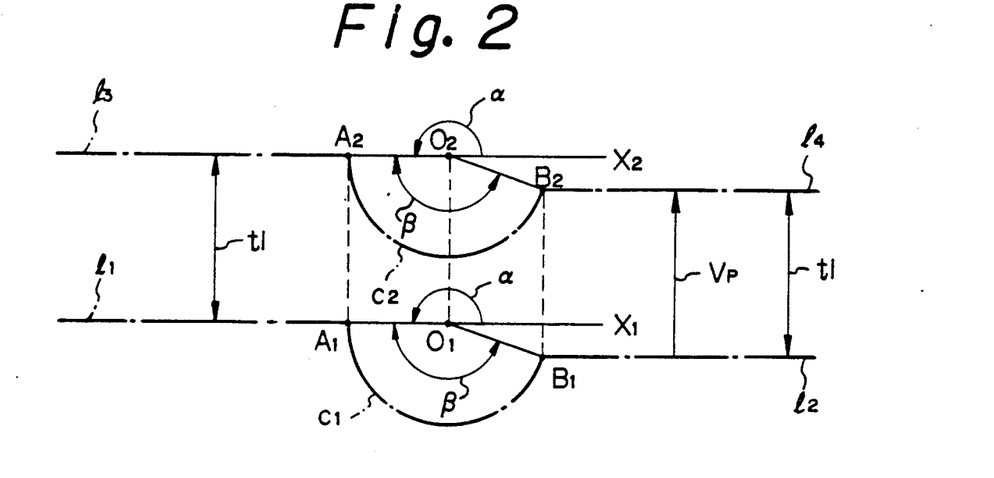
FIG. 2 is a schematic view of figure elements extracted from the machining tracks for creating the convex arc-shaped section by the method in accordance with the embodiment of the present invention.

FIG. 2 is an explanatory view derived from FIG. 1 and illustrates contour elements required for calculating a machining track. In the drawing, reference character $\alpha$ denotes a start angle of each of the arc-shaped tracks $c_1$ and $c_2$ on the upper and lower surfaces $10a$ and $10b$ of the work 10 and reference character $\beta$ denotes an opening angle of each of the arc-shaped tracks $c_1$ and $c_2$. The opening angle $\beta$ has the same value for the arc-shaped tracks $c_1$ and $c_2$. Reference characters $x_1$ and $x_2$ represent an X-coordinate direction, respectively, on the assumption that the drawing shows a plan view representative of an X-Y coordinate system. The X-coordinate directions $c_1$ and $c_2$ provide a reference line for the starting angel $\alpha$, respectively. Reference characters other than the above-described ones are the same as those in FIG. 1.

Figure 3A:
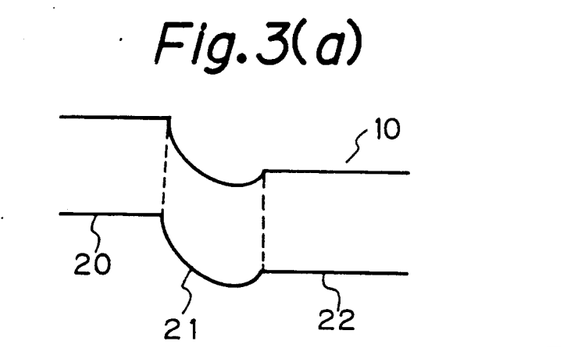
FIGS. 3(a), (b) and (c) are views as seen in three directions which illustrate the work after completion of a machining operation for the convex arc-shaped section by the method in accordance with the embodiment of the present invention.
Figure 3B:
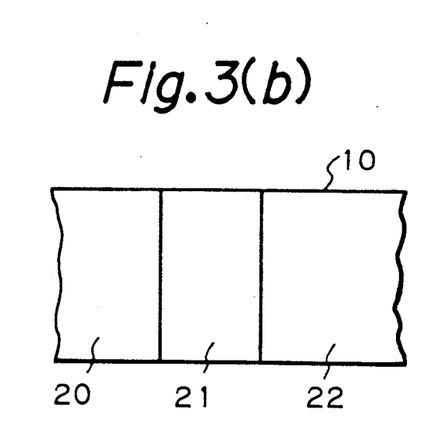
Figure 3C:
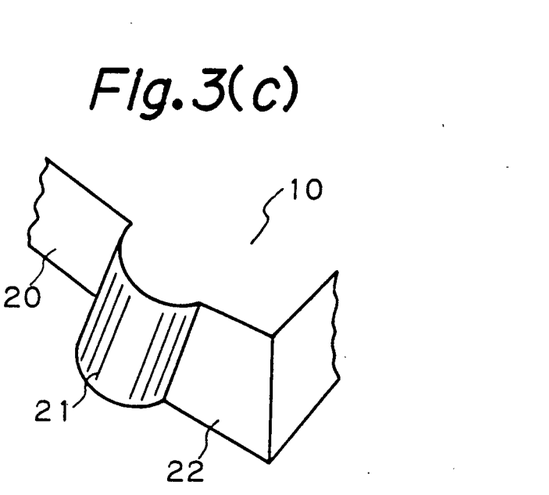

FIG. 3 shows a three-dimensional configuration of the machined work in FIG. 1 as seen in three directions.

Figure 4:
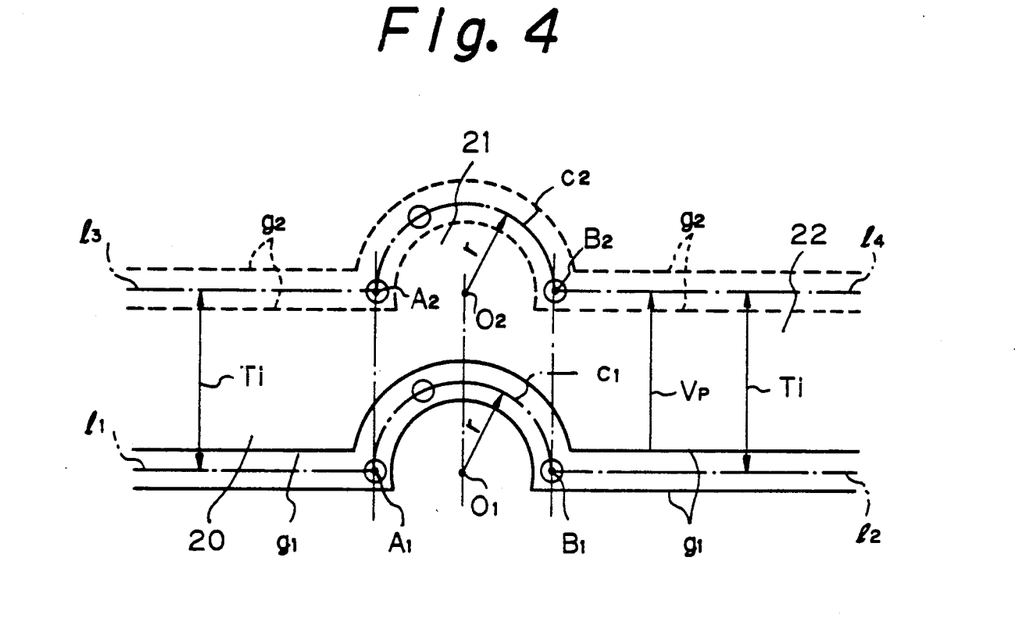
FIG. 4 is an explanatory view which illustrates machining tracks for a product having a concave arc-shaped section created by the method in accordance with the embodiment of the present invention.
Figure 5:
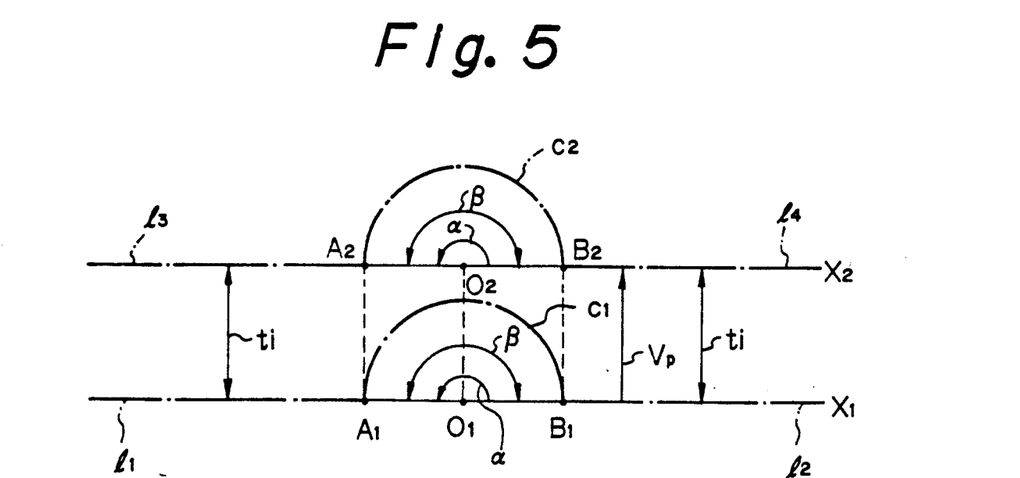
FIG. 5 is a schematic view of figure elements extracted from the machining tracks for creating the concave arc-shaped section by the method in accordance with the embodiment of the present invention.
Figure 6A:
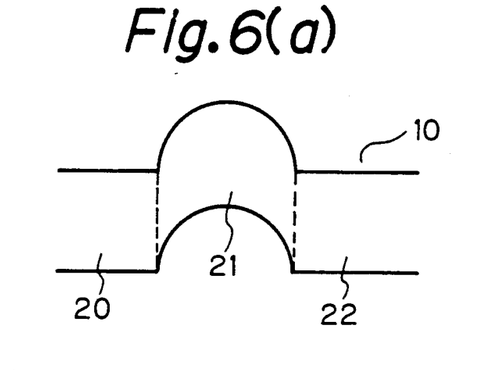
FIGS. 6(a), (b) and (c) are views as seen in three directions which illustrate the work after completion of a machining operation for the concave arc-shaped section by the method in accordance with the embodiment of the present invention.
Figure 6B:
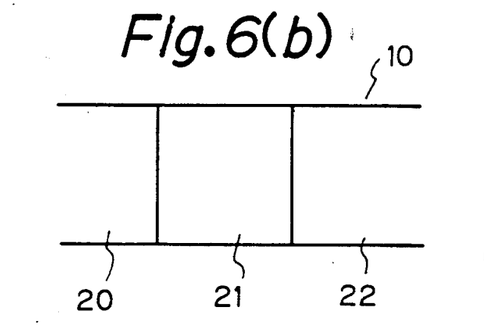
Figure 6C:
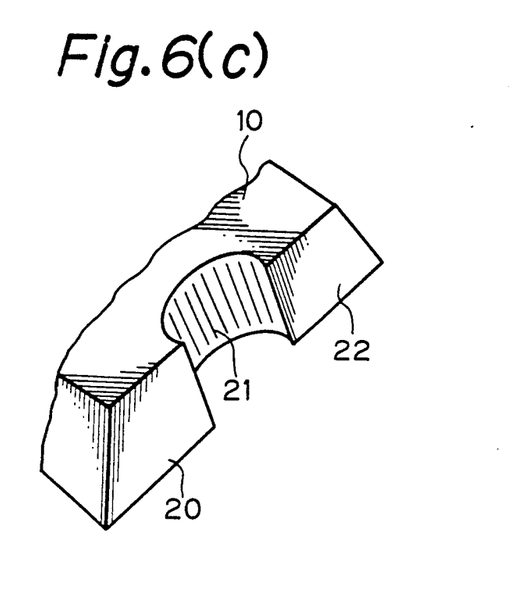

FIG. 4 illustrates a case where the first straight track $l_1$ and the second straight track $l_2$ extend parallel to each other and are located in a common plane. Reference numerals and reference characters are the same as those in FIG. 1. FIGS. 5 and 6 are explanatory views which show a machined work in FIG. 4 and correspond to FIG. 2 and FIG. 3.

Figure 7:
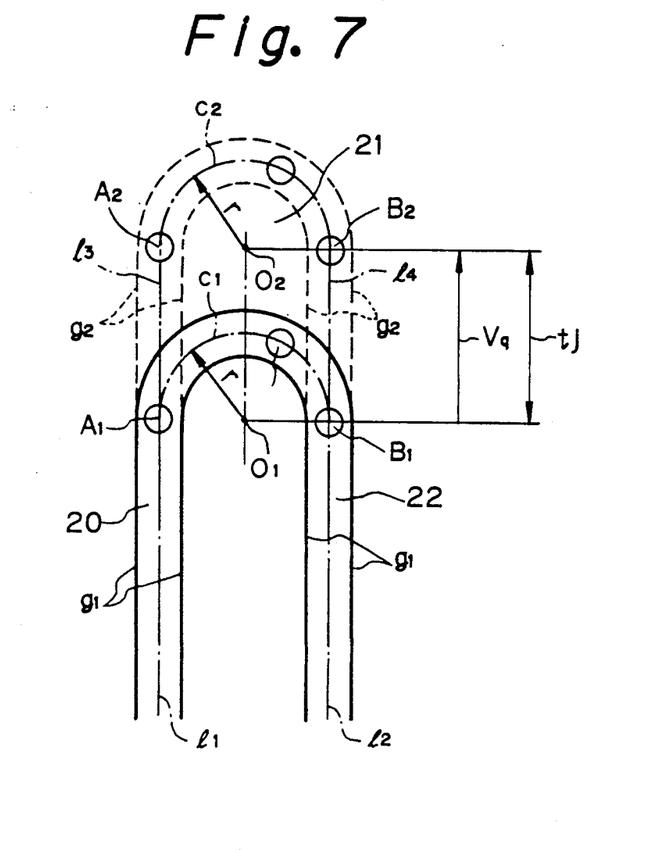
FIG. 7 is an explanatory view which illustrates machining tracks for another work having a convex arc-shaped section created by the method in accordance with the embodiment of the present invention.
Figure 8:
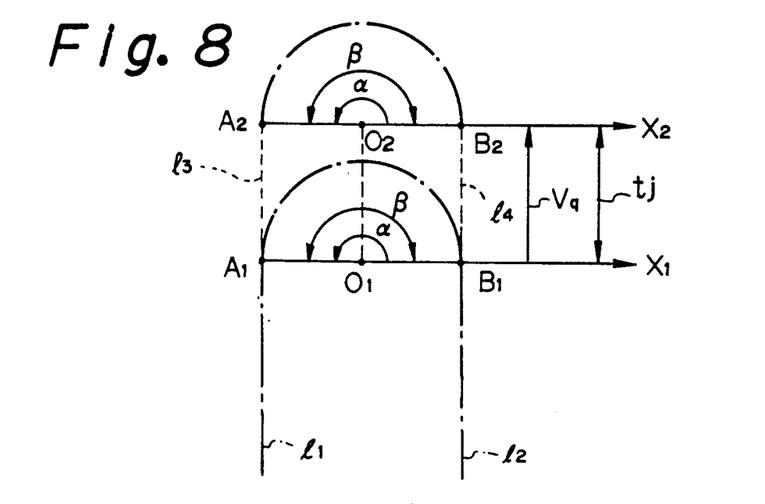
FIG. 8 is a schematic view of figure elements extracted from the machining tracks for creating another concave arc-shaped section by the method in accordance with the embodiment of the present invention.
Figure 9A:
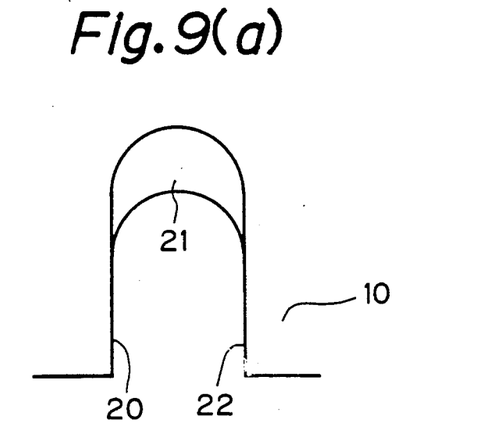
FIGS. 9(a), (b) and (c) are views as seen in three directions which illustrate the work after completion of a machining operation for creating another convex arc-shaped section by the method in accordance with the embodiment of the present invention.
Figure 9B:
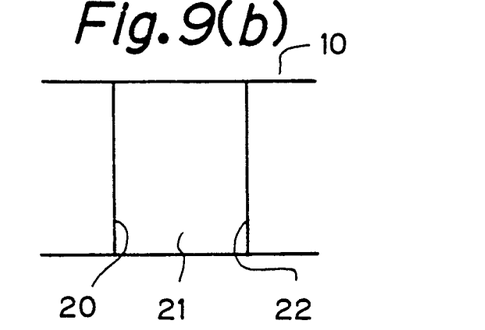
Figure 9C:
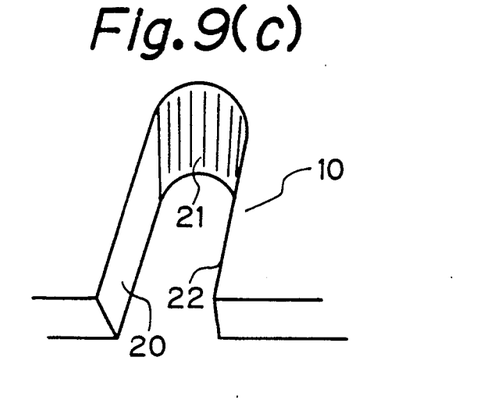

FIG. 7, FIG. 8 and FIG. 9 illustrate a case where a work is machined to a contour including two parallel straight sections and a tapered arc-shaped section located therebetween. The drawings correspond to FIG. 1, FIG. 2 and FIG. 3 and reference numerals and reference characters are the same those in FIG. 1, FIG. 2 and FIG. 3.

In FIG. 7 and FIG. 8, reference character $t_j$ denotes a quantity of taper-offset at the arc-shaped section and reference character $V_g$ denotes a vector the direction of which is the same to that of both the straight tracks $l_1$ and $l_2$ and of which scalar quantity is represented by $t_j$.

Next, operations to be performed by the method of the present invention will be described below.

When the first straight section 20 is to be taper machined, the wire 1 is inclined and then displaced along the first straight tracks $l_1$ and $l_3$. Such displacement allows the wire 1 to simultaneously reach the end point $A_1$ of the first straight track $l_1$ on the lower surface of the work and the end point $A_2$ of the first straight track $l_3$ on the upper surface of the work while an inclination angle of the wire 1 is varied gradually. After the wire 1 reaches the end points $A_1$ and $A_2$, the arc-shaped section 21 is taper machined by displacing the wire 1 until it reaches the end points $B_1$ and $B_2$ of the arc-shaped tracks $c_1$ and $c_2$. During the taper machining of the arc-shaped section 21, the inclination angle of the wire 1 is kept constant, i.e., the driving units 12 and 13 for displacing the upper wire guide 2 in the U- and V-directions as shown in FIG. 10 are not actuated but the driving units 12 and 13 for displacing the table 11 in the X-coordinate and Y-coordinate directions are actuated. Thereafter, the second straight section 22 is taper machined by displacing the wire 1 along the second straight tracks $l_2$ and $l_4$, i.e., machining tracks for the second straight section 22, gradually varying the inclination angle of the wire 1. Here, to accomplish the taper machining as described above, positions of the respective points $A_2$, $B_2$ and $O_2$ on the upper surface of the work should be determined. Description will be made below as to the determination of these points.

When a contour including two parallel straight sections and an arc-shaped section located therebetween is to be derived, first, a vector $V_p$ which is oriented perpendicular to the machining tracks $l_1$ and $l_2$ on the lower surface of the work and of which scalar quantity is represented by the taper-offset $t_j$ is derived. Then, the points $A_2$, $B_2$ and $O_2$ can be derived at positions spaced away from the points $A_1$, $B_1$ and $O_1$ in parallel with the vector $V_p$ by a distance equivalent to the scalar quantity of the latter by using the vector $V_p$. Once the points $A_2$, $B_2$ and $O_2$ on the machining track on the upper surface of the work have been derived in the above-described manner, the result is that the arc-shaped tracks $c_1$ and $c_2$ have the same radius on the upper and lower surfaces of the work, respectively, and moreover the arc starting angle $\alpha$ and the arc opening angle $\beta$ have the same magnitude on the upper and lower surfaces of the work, respectively.

In a case where only the arc-shaped section located between the two parallel straight sections is to be machined in a tapered configuration, a vector $V_q$ is substituted for the vector $V_p$ so that the start point $A_2$ and the end point $B_2$ of an arc-shaped track and the center $O_2$ of an arc on the upper surface of the work are derived. This results in the arc-shaped tracks $c_1$ and $c_2$ on the upper and lower surfaces of the work having the same radius, respectively and more over the arc starting angel $\alpha$ and the arc opening angle $\beta$ have the same magnitude on the upper and lower surfaces of the work, respectively. The reason why the foregoing result is derived will be described in more detail below.

Referring to FIG. 2, a vector $A_1A_2$ and a vector $O_1O_2$ are the same as the vector $V_p$, whereby a rectangle $A_1A_2O_1O_2$ becomes a parallelogram. Consequently, a vector $O_1A_1$ and a vector $O_2A_2$ become the same vector, respectively. Similarly, a rectangle $B_1B_2O_1O_2$ becomes a parallelogram and thereby a vector $O_1B_1$ and a vector $O_2B_2$ become the same vector, respectively. Accordingly, the arc starting angles $\alpha$ for the arcshaped tracks $c_1$ and $c_2$ are equal on the upper and lower surfaces of the work and the arc opening angles $\beta$ for the arc-shaped tracks $c_1$ and $c_2$ are also equal on the upper and lower surfaces of the work. In addition, the upper wire guide 2 located above the upper surface of the work and the lower wire guide 5 located below the lower surface of the work scribe entirely the same arc-shaped displacement track as the arc-shaped tracks $c_1$ and $c_2$.

Another case where only the arc-shaped section located between two parallel straight sections is machined in a tapered configuration will be described below with reference to FIG. 8.

As will be apparent from a comparison of FIG. 8 with FIG. 2, elements are the same as those in FIG. 2 with the exception that a vector $V_q$ is substituted for the vector $V_p$ in FIG. 2.

According to the present invention, the arc-shaped tracks $c_1$ and $c_2$ on the upper and lower surfaces of the work become equal with the result that taper machining as shown in FIG. 3, FIG. 6 and FIG. 9 can be accomplished with the same radius on the upper and lower surfaces of a work.

The present invention has been described above in relation to a case where arc-shaped tracks on the upper and lower surfaces of a work are equal. Obviously, however, the same advantageous effects as mentioned above are obtainable, even when any distance between upper and lower wire guides 2 and 5 is substituted for the distance between the upper and lower surfaces of a work.

Further, the present invention has been described above in relation to a case where the lower surface $10b$ of the work serves as a reference surface for taper machining. It should, of course, be understood that the upper surface $10a$ of the work may be used as a reference surface.

As will be readily apparent from the above description, according to the present invention, in a case where an arc-shaped section located between two parallel straight sections but not extending tangential to them is to be machined or in a case of an arc-shaped section which is located between two parallel straight sections and should be machined along them in opposite directions, joint points between a machining track and an arc-shaped track as well as a center point of the arc-shaped tack can be definitely determined on the upper or lower surface of a work by using a vector extending perpendicular to both the straight sections or in parallel with them under a condition that the upper or lower surface of the work is displaced by the same amount of taper-offset. Consequently, a machining speed along the arc-shaped track can be kept constant, whereby taper machining with the same radius at the upper and lower surfaces of a work can be simply accomplished with a high degree of accuracy.

While the present invention has been described above with respect to a preferred embodiment thereof, it should of course be understood that it should not be limited thereto but that various changes or modifications may be made without departing from the scope of the invention as defined by the appended claims.

What is claimed is:

1. A wire cut-type electric discharging method of machining a work for machining a portion having a predetermined taper, said portion comprising a first straight section, a second straight section extending in parallel with said first straight section and an arc-shaped section located between said first and second straight sections and having a same radius on the upper and lower surfaces of said work, comprising the steps of:

deriving a vector representative of a positional relationship among a number of corresponding points on two machining tracks each of which is defined by a first straight track, an arc-shaped track and a second straight track by allowing said portion to be machined to intersect the upper and lower surfaces of the work;

determining a start point and an end point of said arc-shaped track on one of said machining tracks by displacing a start point and an end point of said arc-shaped track on the other machining track by said vector;

determining the other machining track based on one of the machining tracks which has been determined in the above-described manner; and machining said portion while moving a wire serving as an electrode along both the machining tracks.

2. The method as claimed in claim 1, wherein scalar quantity of said vector is equal to an amount of taper-offset, a direction of the vector is oriented perpendicular to said first straight track and said second straight track in a case where the direction of machining the first straight section is the same as the direction of machining the second straight track and the direction of the vector is oriented in parallel with the first straight track and the second straight track in a case where the direction of machining the first straight section is opposite to the direction of machining the second straight section.

3. The method as claimed in claim 2, wherein a relationship among an amount of taper-offset $t_i$, a wire inclination angle $\theta_i$ and a work thickness t is represented by the following equation:

$$t_i = t \times \tan \theta_i.$$

4. A wire cut-type electric discharging method of machining for machining a portion of a work placed on a movable table adapted to move in two directions in a horizontal plane located between a movable upper wire guide and a movable lower wire guide by using a wire serving as an electrode which extends between said upper wire guide and said lower wire guide, said portion to be machined having a predetermined taper and comprising a first straight section, a second straight section extending in parallel with said first straight section and an arc-shaped section located between said first and second straight sections and having a same radius on the upper and lower surfaces of said work, comprising the steps of:

deriving a vector representative of a positional relationship among a number of corresponding points on two machining tracks each of which is defined by a first straight track, an arc-shaped track and a second straight track by allowing said portion to be machined to intersect the upper and lower surfaces of the work, said vector being such that a relationship among an amount of taper-offset $t_i$, a wire inclination angle $\theta_i$ and a work thickness t is represented by an equation of $t_i = t \times \tan \theta_i$, scalar quantity of the vector is equal to the amount of taper-offset, a direction of the vector is oriented perpendicular to said first straight track and said second straight track in a case where the direction of machining the first straight section is the same as the direction of machining the second straight section, and a direction of the vector is oriented in parallel to the first straight track and the second straight track in a case where the direction of machining the first straight section is opposite to the direction of machining the second straight section;

determining a start point and an end point of said arc-shaped track on one of said machining tracks by displacing a start point and an end point of said arc-shaped track on the other machining tracks by said vector;

determining the other machining track based on one of the machining tracks which has been determined in the above-described manner; and machining said portion by allowing said wire serving as an electrode to simultaneously pass by said corresponding points on both the machining tracks.

* * * * *